Figure 1:
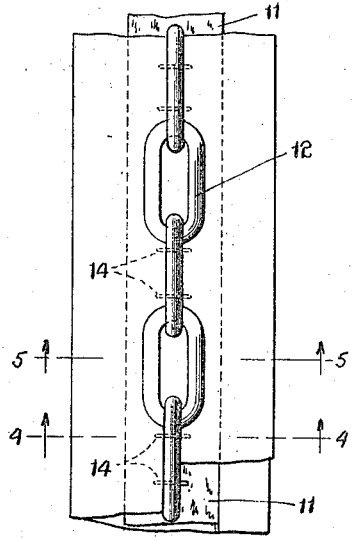

A. RICH.
METAL CHAIN TREAD TIRE.
APPLICATION FILED JULY 13, 1915.

1,167,596.

Patented Jan. 11, 1916.

WITNESSES:
H.W. Meade

INVENTOR
Ambrose Rich
BY
A.M. Wooster
ATTORNEY

UNITED STATES PATENT OFFICE.

AMBROSE RICH, OF STAMFORD, CONNECTICUT.

METAL-CHAIN-TREAD TIRE.

1,167,596.  Specification of Letters Patent.  Patented Jan. 11, 1916.

Application filed July 13, 1915. Serial No. 39,608.

*To all whom it may concern:*

Be it known that I, AMBROSE RICH, a citizen of the United States, residing at Stamford, county of Fairfield, State of Connecticut, have invented an Improvement in Metal-Chain-Tread Tires, of which the following is a specification.

This invention has for its object to provided a durable and effective non-skid tire which shall be relatively inexpensive to produce and will combine in a single structure adapted for use at all times the qualities of a non-skid rubber tire and of the various detachable metallic non-skid devices.

With these ends in view I have devised the novel metal chain tread tire which I will now describe, referring to the accompanying drawing forming a part of this specification and using reference characters to indicate the several parts.

Figure 2:
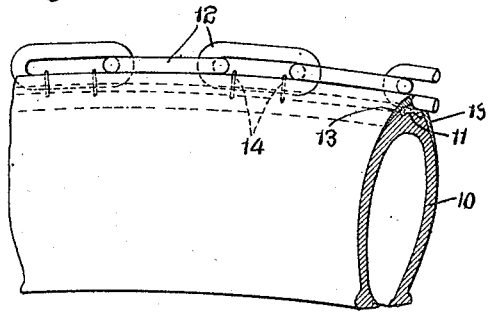
Figure 4:
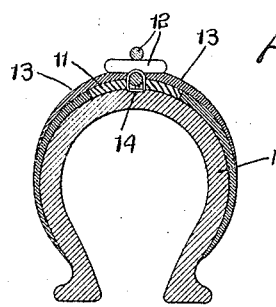
Figure 3:
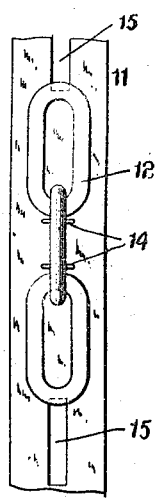
Figure 5:
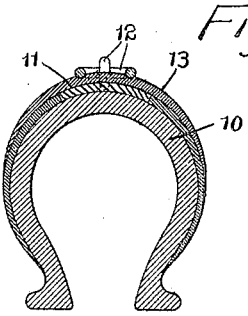

Figure 1 is an edge view of a portion of a tire embodying one form of my novel invention; Fig. 2 a side elevation corresponding therewith; Fig. 3 a view showing a piece of the foundation strip with a chain secured thereto; Fig. 4 a section on the line 4—4 in Fig. 1, looking in the direction of the arrows; Fig. 5 a section on the line 5—5 in Fig. 1, looking in the direction of the arrows, and Fig. 6 is a view corresponding with Fig. 1, showing a tire provided with two relatively smaller metallic chains instead of one relatively larger one.

10 denotes the body of the tire which may be built up in the usual or any preferred manner, 11 a non-metallic foundation strip which may be made of any strong and durable waterproof material, such as would be adapted for use in the manufacture of belts, 12 a metallic chain and 13 the finishing ply. The chain used may be of any suitable character, ordinarily a common welded link, iron or steel chain. This chain is attached to the foundation strip in any suitable manner, as by means of metallic staples 14. The chain is laid upon the foundation strip as in Fig. 3, the links lying alternately vertically and horizontally to the strip. Slots or slits 15 may be provided in the foundation strip to partly receive the vertical links, which are attached in place by the staples, as clearly shown in Figs. 3 and 4. If preferred, the slots or slits may be omitted and the vertical links embedded slightly in the foundation strip. In practice the intermediate links need not be fastened and are preferably left slightly loose, although they may be fastened if preferred.

Figure 6:
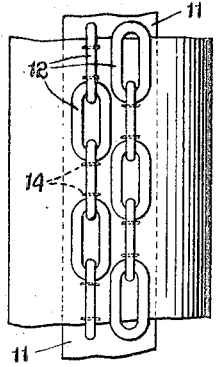

The form illustrated in Fig. 6 differs only in the use of two chains instead of one, said chains being arranged with the vertical links of one chain lying contiguous to the intermediate links of the other, so that there is in fact a staggered line of vertical links entirely around the tire. The foundation strip with the chain or chains secured thereto is inset or molded into the periphery of the body and then the finishing ply is applied in any ordinary or preferred manner. In the completed tire, the intermediate links lie upon the surface of the finishing ply, as clearly shown, the finishing ply filling in the space between the intermediate links and the foundation strip.

Having thus described my invention I claim:

1. A non-skid tire comprising a body, a foundation strip surrounding the body and provided with slots, a metallic chain secured to the foundation strip with alternate links lying vertically in the slots and a finishing ply over the foundation strip upon which the intermediate links of the chain lie.

2. A non-skid tire comprising a body, a metallic chain, a foundation strip having slots to receive alternate links of the chain vertically, means for attaching the vertical links to the foundation strip, and a finishing ply lying between the intermediate links and the supporting strip.

In testimony whereof I affix my signature.

AMBROSE RICH.